(12) United States Patent
Yang et al.

(10) Patent No.: US 11,120,513 B2
(45) Date of Patent: Sep. 14, 2021

(54) CAPITAL CHAIN INFORMATION TRACEABILITY METHOD, SYSTEM, SERVER AND READABLE STORAGE MEDIUM

(71) Applicant: ADVANCED NEW TECHNOLOGIES CO., LTD., Grand Cayman (KY)

(72) Inventors: Yongsheng Yang, Hangzhou (CN); Yingjie Li, Hangzhou (CN); Wensheng Dou, Hangzhou (CN); Xinyu Huang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/827,233

(22) Filed: Mar. 23, 2020

(65) Prior Publication Data

US 2020/0242702 A1 Jul. 30, 2020

Related U.S. Application Data

(63) Continuation of application No. PCT/CN2020/071697, filed on Jan. 13, 2020.

(30) Foreign Application Priority Data

May 24, 2019 (CN) .......................... 201910440592.1

(51) Int. Cl.
*G06Q 40/00* (2012.01)
*G06F 16/23* (2019.01)
(Continued)

(52) U.S. Cl.
CPC ............ *G06Q 40/12* (2013.12); *G06F 9/541* (2013.01); *G06F 16/2379* (2019.01); *G06F 16/245* (2019.01); *G06Q 40/02* (2013.01)

(58) Field of Classification Search
CPC .... G06Q 40/12; G06Q 40/02; G06F 16/2379; G06F 16/245; G06F 9/541
See application file for complete search history.

(56) References Cited

U.S. PATENT DOCUMENTS 9,875,510 B1 1/2018 Kasper
10,097,356 B2 10/2018 Zinder
(Continued)

FOREIGN PATENT DOCUMENTS

CN 107491519 A * 12/2017
CN 107491519 A 12/2017
(Continued)

OTHER PUBLICATIONS

First Search of CN Application No. 201910440592.1 dated Apr. 3, 2020, (1 Page).
(Continued)

*Primary Examiner* — A. Hunter Wilder
*Assistant Examiner* — Joseph M Mutschler

(57) ABSTRACT

Methods, systems, and apparatus, including computer programs encoded on computer storage media, for tracing capital chain information are provided. One of the methods, implemented by a computing device, includes: receiving a query request for querying capital chain information of a target account; parsing the query request to obtain an account identifier of the target account and a query condition; retrieving, based on the account identifier from a blockchain system, a plurality of pieces of capital change information of the target account meeting the query condition, wherein the plurality of pieces of capital change information of the target account are pre-recorded in the blockchain system based on a consensus mechanism; and obtaining the capital chain information by linking the plurality of pieces of capital change information based on information associated with a timeline or a plurality of (Continued)

participants associated with the pieces of capital change information.

18 Claims, 5 Drawing Sheets

(51) Int. Cl.
  *G06Q 40/02* (2012.01)
  *G06F 9/54* (2006.01)
  *G06F 16/245* (2019.01)

(56) References Cited

U.S. PATENT DOCUMENTS

| | | | |
|---|---|---|---|
| 10,333,705 B2 | 6/2019 | Smith et al. | |
| 2015/0163206 A1 | 6/2015 | McCarthy et al. | |
| 2016/0342989 A1 | 11/2016 | Davis | |
| 2016/0342994 A1 | 11/2016 | Davis | |
| 2017/0048235 A1 | 2/2017 | Lohe et al. | |
| 2017/0132626 A1 | 5/2017 | Kennedy | |
| 2017/0214675 A1 | 7/2017 | Johnsrud et al. | |
| 2018/0075527 A1 | 3/2018 | Nagla et al. | |
| 2018/0253702 A1 | 9/2018 | Dowding | |
| 2018/0367506 A1 | 12/2018 | Ford et al. | |
| 2019/0228391 A1 | 7/2019 | Hu et al. | |
| 2020/0250633 A1* | 8/2020 | Vinson | G06Q 20/405 |

FOREIGN PATENT DOCUMENTS

| | | | |
|---|---|---|---|
| CN | 107851281 A | | 3/2018 |
| CN | 107924389 A | | 4/2018 |
| CN | 108229943 A | | 6/2018 |
| CN | 108292396 A | | 7/2018 |
| CN | 108665372 A | | 10/2018 |
| CN | 108897758 A | | 11/2018 |
| CN | 109218298 A | | 1/2019 |
| CN | 109359975 A | * | 2/2019 |
| CN | 109417549 A | | 3/2019 |
| CN | 109727031 A | | 5/2019 |
| CN | 109741060 A | | 5/2019 |
| CN | 109768987 A | | 5/2019 |
| CN | 109783653 A | | 5/2019 |
| CN | 110288341 A | | 9/2019 |
| JP | 2018525729 A | | 9/2018 |
| JP | 2019079551 A | | 5/2019 |
| WO | 2014201059 A1 | | 12/2014 |
| WO | 2017011601 A1 | | 1/2017 |
| WO | 2019051822 A1 | | 3/2019 |

OTHER PUBLICATIONS

Written Opinion and International Search Report for PCT Application No. PCT/CN2020/071697 made available to public on Dec. 3, 2020.

* cited by examiner

CAPITAL CHAIN INFORMATION TRACEABILITY METHOD, SYSTEM, SERVER AND READABLE STORAGE MEDIUM

CROSS-REFERENCE TO RELATED APPLICATIONS

The present application is a continuation application of International Patent Application No. PCT/CN2020/071697, filed on Jan. 13, 2020, and entitled "Capital Chain Information Traceability Method, System, Server and Readable Storage Medium." The PCT application claims priority to and benefits of the Chinese Patent Application No. 201910440592.1, filed on May 24, 2019. All of the above-referenced applications are incorporated herein by reference in their entirety.

TECHNICAL FIELD

The embodiments of the specification relate to a technical field of information processing, and in particular, to a capital chain information tracing method, system, server, and readable storage medium.

BACKGROUND

When a user conducts a transaction on a third-party payment platform, capital chain information is often stored only for a limited period of time, such as only for a period of six months. When time exceeds the time limit, the capital chain information cannot be found. Moreover, even within the time limit, lots of time and resources are consumed in each query of the capital chain information due to inefficient tracing methods. On the other hand, the capital chain information contains a large amount of valuable information which is often beneficial to risk control or other matters. Thus, how to efficiently trace the capital chain information is an issue worthy of the consideration of those skilled in the art.

SUMMARY

The embodiments of the specification provide a capital chain information tracing method, system, server, and readable storage medium.

According to a first aspect, the embodiments of the specification provide a computer-implemented method for tracing capital chain information. The method may include: receiving a query request for querying capital chain information of a target account; parsing the query request to obtain an account identifier of the target account and a query condition; retrieving, based on the account identifier from a blockchain system, a plurality of pieces of capital change information of the target account meeting the query condition, wherein the plurality of pieces of capital change information of the target account are pre-recorded in the blockchain system based on a consensus mechanism; and obtaining the capital chain information by linking the plurality of pieces of capital change information based on information associated with a timeline or a plurality of participants associated with the pieces of capital change information.

In some embodiments, the target account may be associated with a third-party payment platform, and the blockchain system may include a plurality of blockchain nodes respectively corresponding to a plurality of regions in which transactions on the third-party payment platform occur, the transactions causing a plurality of capital changes associated with the plurality of pieces of capital change information.

In some embodiments, before receiving a query request for querying capital chain information of a target account, the method may further include: recording a piece of capital change information into the blockchain system in response to a capital change associated with the piece of capital change information occurring with respect to the target account.

In some embodiments, recording a piece of capital change information into the blockchain system in response to a capital change associated with the piece of capital change information occurring with respect to the target account may include: recording the piece of capital change information in a node of the blockchain system corresponding to a region where the capital change associated with the piece of capital change information occurs.

In some embodiments, recording a piece of capital change information into the blockchain system in response to a capital change associated with the piece of capital change information occurring with respect to the target account may include: providing an interface accessible to a third-party payment system; and receiving an application programming interface (API) call from the third-party payment system via the interface.

In some embodiments, the piece of capital change information comprises capital transfer information, capital withdrawal information, or capital deposit information; and recording the piece of capital change information into the blockchain system in response to a capital change associated with the piece of capital change information occurring with respect to the target account may include: selecting a blockchain from a plurality of blockchains associated with the blockchain system based on a type of the piece of capital change information; and storing the piece of capital change information in the selected blockchain.

In some embodiments, the query condition comprises a capital change time frame, a capital inflow or outflow direction, capital transaction party information, or a combination thereof.

In some embodiments, the consensus mechanism comprises: proof-of-work (PoW), proof-of-stake (POS), delegated proof-of-stake (DPoS), practical byzantine fault tolerance (PBFT), or delegated byzantine fault tolerance (DBFT).

According to a second aspect, the embodiments of the specification provide a system for tracing capital chain information. The system may include one or more processors and one or more non-transitory computer-readable memories coupled to the one or more processors and configured with instructions executable by the one or more processors to cause the computing device to perform operations comprising: receiving a query request for querying capital chain information of a target account; parsing the query request to obtain an account identifier of the target account and a query condition; retrieving, based on the account identifier from a blockchain system, a plurality of pieces of capital change information of the target account meeting the query condition, wherein the plurality of pieces of capital change information of the target account are pre-recorded in the blockchain system based on a consensus mechanism; and obtaining the capital chain information by linking the plurality of pieces of capital change information based on information associated with a timeline or a plurality of participants associated with the pieces of capital change information.

According to a third aspect, the embodiments of the specification provide non-transitory computer-readable storage medium configured with instructions executable by one or more processors to cause the one or more processors to perform operations comprising: receiving a query request for querying capital chain information of a target account; parsing the query request to obtain an account identifier of the target account and a query condition; retrieving, based on the account identifier from a blockchain system, a plurality of pieces of capital change information of the target account meeting the query condition, wherein the plurality of pieces of capital change information of the target account are pre-recorded in the blockchain system based on a consensus mechanism; and obtaining the capital chain information by linking the plurality of pieces of capital change information based on information associated with a timeline or a plurality of participants associated with the pieces of capital change information.

The embodiments of the specification have the following beneficial effects. The capital chain information is stored by using a blockchain system; and owing to a tamper-proofing characteristic of the blockchain system, the efficiency and reliability for tracing the capital chain information are improved, avoiding a query failure caused by a storage time limit, and also avoiding the time and resource consumption problem caused by querying the capital chain information on a third-party payment system.

DETAILED DESCRIPTION

In order to better understand the above-described embodiments, the embodiments of the specification are described in detail below in combination with the accompanying drawings. The embodiments of the specification and features in the embodiments are detailed descriptions of the specification, rather than limiting the scope of the specification. The embodiments of the specification can be mutually combined, as well as the technical characteristics in the embodiments, as long as no conflict exists.

Figure 1:
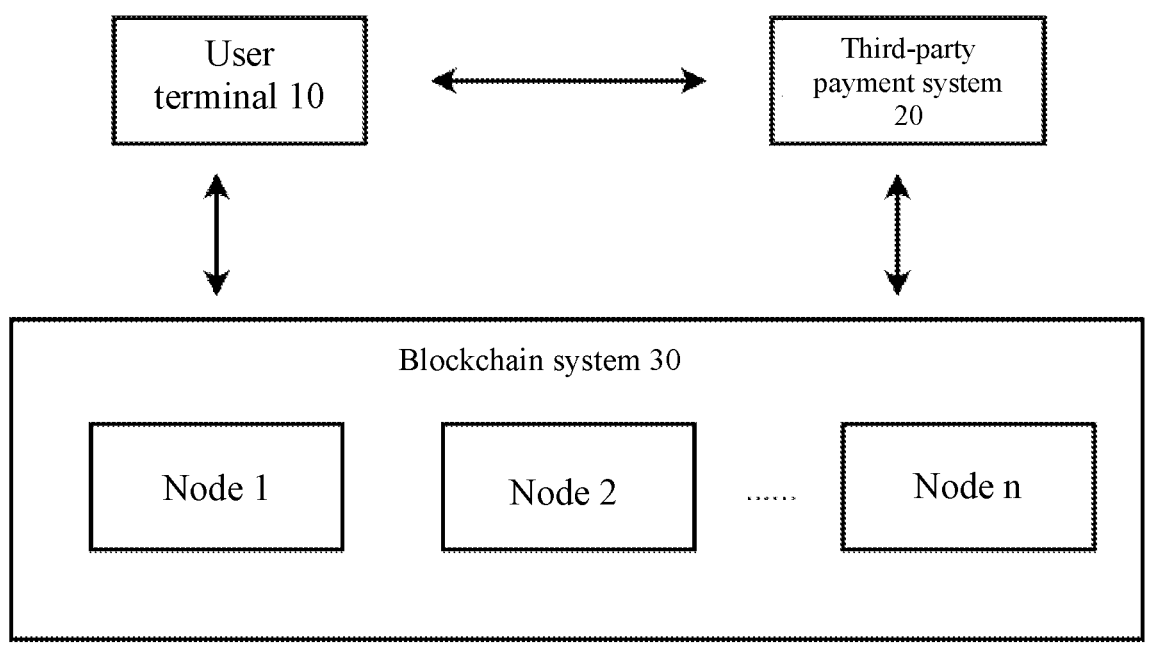
FIG. 1 shows a schematic diagram of a scenario for a capital chain information tracing method according to some embodiments of the specification.

Referring to FIG. 1, a schematic diagram of a scenario for a capital chain information tracing method according to some embodiments of the specification is shown. This scenario shows a user terminal 10, a third-party payment platform 20, and a blockchain system 30. The user terminal 10 performs a capital change with respect to an account of a user, such as online payment and fund transfer, on the third-party payment platform 20 according to the user's operations. When the user terminal 10 performs the capital change, the third-party payment platform 20 calls the blockchain system 30 to record capital change information (associated with the capital change) into the blockchain system 30. The blockchain system 30 comprises a plurality of nodes, e.g., a node 1, a node 2, . . . , and a node n as shown in FIG. 1, which can be deployed in the blockchain system 30 according to transaction locations; and the capital change information is recorded in the corresponding nodes. For example, the nodes can be deployed in the blockchain system 30 to correspond to respective locations or regions where the transactions or the capital changes caused by the transactions (e.g., a capital transfer, a capital withdrawal, a capital deposit, etc.) occur. In addition, the capital change information associated with a capital change caused by a transaction may be recorded in a node corresponding to the location or region where the transaction (or the capital change) occurs. When the user is to query capital chain information of the account of the user on the third-party payment platform 20, a query request may be sent from the user terminal 10 to the blockchain system 30; and the blockchain system 30 retrieves the capital chain information of the account and returns the capital chain information to the user terminal 10.

The above-described scenarios and descriptions are examples, and other methods may alternatively be used. For example, with regard to the methods that a user may use for querying capital chain information, in addition to using the user terminal 10 to query in the blockchain system 30, other methods may alternatively be adopted. For example, a query request may be sent to the third-party payment system 30 first; and the third-party payment system 30 forwards the query request to the blockchain system 30, and then forwards a query result returned by the blockchain system 30 to the user terminal 10.

In some embodiments, the capital chain information may describe relationships among multiple pieces of capital change information with respect to an account. For example, the capital chain information may be formed by linking the pieces of capital change information with respect to the account according to the timeline or participating parties of the capital transactions (e.g., a transfer) causing the capital changes associated with the pieces of capital change information.

Figure 2:
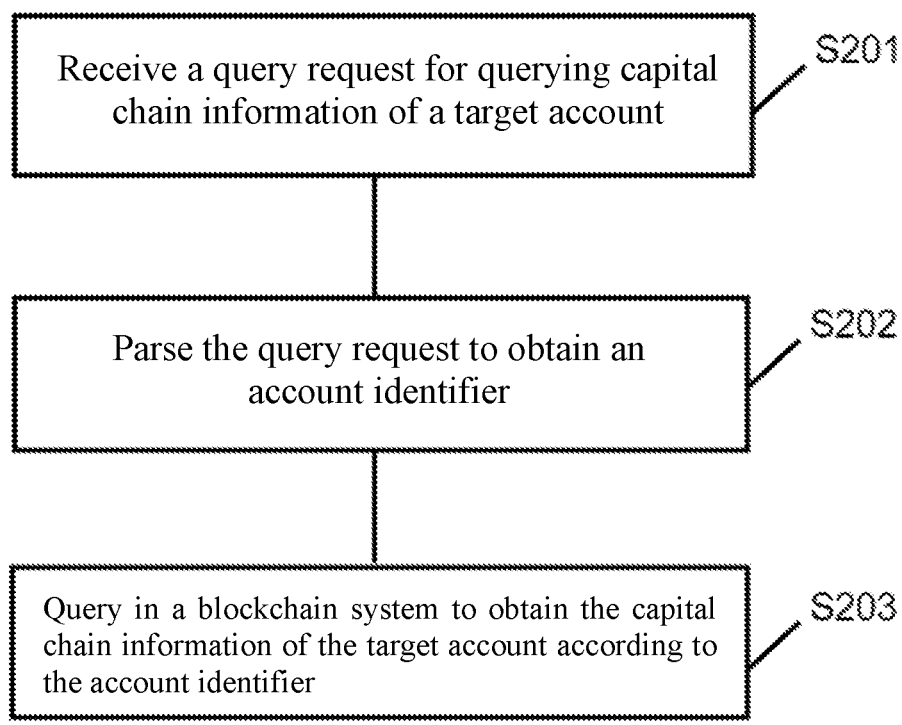
FIG. 2 shows a flow chart of a capital chain information tracing method according to some embodiments of the specification.

The embodiments of the specification provide a capital chain information tracing method for querying capital chain information of a target account in a third-party payment system. Referring to FIG. 2, the capital chain information tracing method comprises steps S201 to S203.

S201: receiving a query request for querying capital chain information of a target account.

The target account is an account to be queried. When a user queries the capital chain information of the target account, a query request can be sent to a blockchain system directly or through a third-party payment system; and the query request at least may carry an account identifier (ID) of the target account, which may alternatively be, for example, a task identifier (ID).

Moreover, the query request may further carry a query condition, which includes, but is not limited to, a capital change time frame, a capital inflow or outflow direction, and capital transaction party information. For example, information of the capital inflow in the past month can be queried by setting the query condition.

S202: parsing the query request to obtain an account identifier.

After receiving the query request for querying the capital chain information of the target account, the blockchain system parses the query request to obtain the account identifier. As described above, the account identifier may be an account id or a task id.

If the query request further comprises a query condition, the query condition is also obtained by parsing, which includes, but is not limited to, a capital change time frame, a capital inflow or outflow direction, and capital transaction party information.

S203: querying in a blockchain system to obtain the capital chain information of the target account according to the account identifier.

The blockchain system may retrieve multiple pieces of capital change information corresponding to the account identifier, and links all the pieces of capital change information together to obtain the capital chain information. For example, the blockchain system may link the pieces of capital change information based on a timeline or the parties participating in the transactions causing the capital changes associated with the pieces of capital change information, so as to obtain the capital chain information.

If the query request further comprises a query condition, the capital change information of the target account, which meets the query condition, is retrieved according to the query condition, to constitute the capital chain information. For example, a query condition may be querying capital chain information in the inflow direction with respect to the account for the past month; and then the multiple pieces of capital change information in the inflow direction in the past month may be retrieved and then aggregated to obtain the capital chain information.

In order to achieve capital chain tracing, in some embodiments, the blockchain system may be created in advance; and when a capital change occurs, the third-party system records the capital change information into the blockchain system. Thus, users' querying of the capital chain information through the blockchain system can be achieved.

Any existing blockchain system construction method may be used to create the blockchain system. For example, the blockchain system is created through the following steps.

Step 1: determining a representation method for the blockchain.

A blockchain is composed of unchangeable and sequentially-recorded blocks. Various data can be recorded on the blocks. In the embodiments of the specification, the blocks are used to record the capital change information. The blocks may be linked together through a hash table.

By creating a blockchain class, an initially empty list (for storing the blockchain) and a list for storing transactions are created in a constructor of the blockchain class. Blockchain parameters are set for managing the blockchain and for storing transaction information and methods for adding blocks.

Step 2: determining a representation method for blocks.

For example, it may be determined that each block comprises an index, a time stamp, a transaction list, a proof (more proofs later), and a hash value for the previous block. Each block comprises its own variables and the hash value for the previous block. The hash value guarantees a tamper-proofing characteristic of the blockchain; and if a block is attacked and its hash value is changed, hash values of all subsequent blocks can be changed.

Step 3: determining a method for adding a transaction onto a block.

For example, the transaction may be added by using a new_transaction ( ) parameter. After adding transaction information to a list, the new_transaction ( ) returns an index number of the next to-be-mined block; and the transaction information may be packaged into the block.

Step 4: determining a consensus mechanism.

The consensus mechanism is a core mechanism in the blockchain technologies. In the blockchain, "consensus" may indicate that nodes (participants) of the blockchain reach an agreement on a state of the blockchain. Because the blockchain is decentralized, any decision, state, change, or the like, requires all nodes (participants) to reach the consensus using some mechanism. The consensus mechanism is alternatively referred to as a consensus algorithm. The consensus algorithm includes, but is not limited to, proof-of-work (PoW), proof-of-stake (POS), delegated proof-of-stake (DPoS), practical byzantine fault tolerance (PBFT), delegated byzantine fault tolerance (DBFT), etc.

After the blockchain system is created, the blockchain system can be called to record capital change information into the blockchain system when a capital change occurs with respect to an account. This process may be referred to as a data chaining process. The data chaining process may comprise three stages: an acceptance stage, a consensus stage, and a storage stage. In the acceptance stage, the to-be-chained data may be received by a blockchain node in a blockchain network and accepted by the blockchain node; in the consensus stage, after the blockchain node accepts the data, other blockchain nodes in the blockchain network may participate in a consensus processing of the data, and the storage stage may be entered after a consensus is reached for the data; and in the storage stage, the blockchain node may perform a chaining process for the consensus-reached data.

Therefore, the storage of the capital change information in the blockchain system is completed; and users can query the capital chain information in the blockchain system subsequently.

Figure 3:
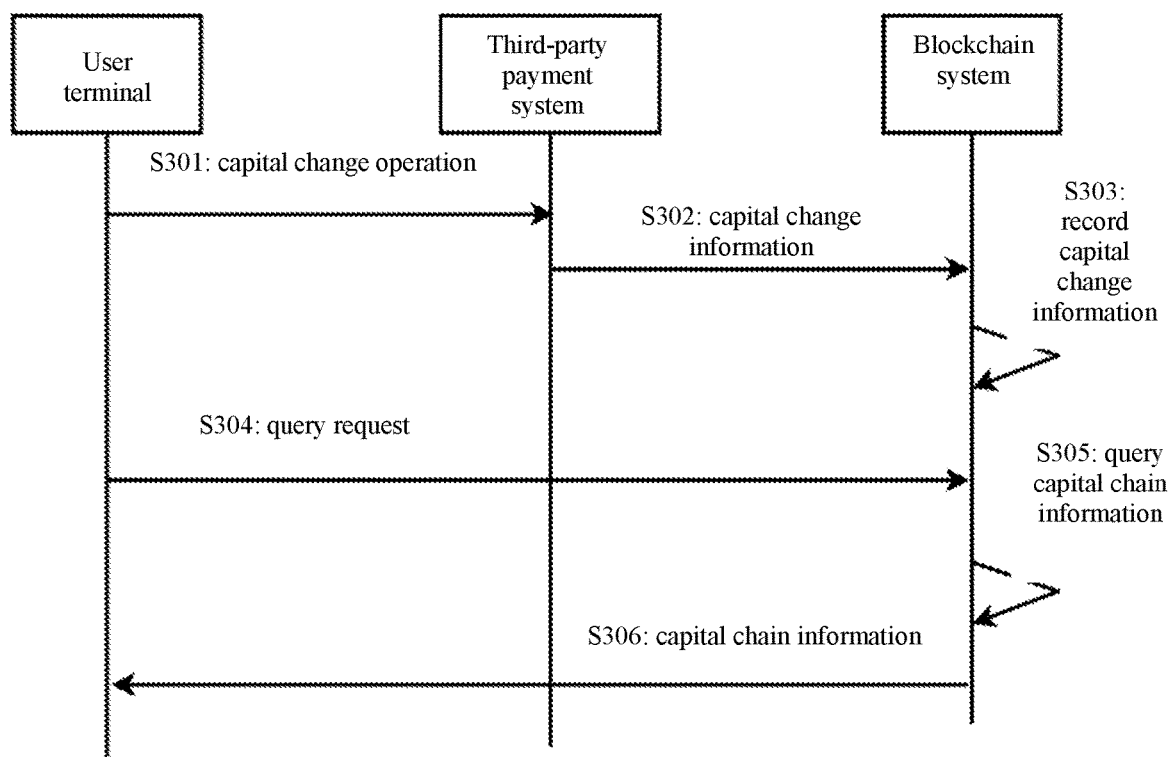
FIG. 3 shows a flow chart of another capital chain information tracing method according to some embodiments of the specification.

Referring to FIG. 3, a flow chart of another capital chain information tracing method provided by some embodiments of the specification. A process relationship among a user terminal (user), a third-party payment system, and a blockchain system is shown in FIG. 3.

At step S301: A user performs a capital change operation in a third-party payment system, and thus capital change information is generated.

The capital change operation may refer to an operation that leads to a capital change, including, but not limited to, a capital transfer operation, a capital withdrawal operation, or a capital deposit operation; and accordingly, the capital change information includes, but is not limited to, capital transfer information, capital withdrawal information, or capital deposit information.

At step S302: The third-party payment system sends the capital change information to a blockchain system.

In order to send the capital change information to the blockchain system, the third-party payment system may learn in advance about an interface of the blockchain system for calling the blockchain system. For example, the blockchain system may provide an application programming interface (API) accessible to the third-party payment system such that the third-party payment can send the capital change information to the blockchain system by calling the API of the blockchain system.

At step S303: The blockchain system records the capital change information.

In order to save resource transmission overhead, a distribution of all the nodes in the blockchain system can be set according to a transaction deployment of the third-party payment system. For example, according to the transaction deployment of the third-party payment system, corresponding blockchain nodes are set up in various respective regions where transactions occur on the third-party payment system; and the blockchain nodes constitute the blockchain system. Therefore, when capital change information is to be recorded, the blockchain node corresponding to each region can be queried in the blockchain system, and the capital change information can be recorded in a blockchain node corresponding to a region where the capital change (or the transaction causing the capital change) occurs.

Moreover, as described above, the capital change information may comprise various information such as capital transfer information, capital withdrawal information, and capital deposit information. Different capital change information can be recorded in different blockchains. The blockchain system may comprise or be configured to interface with multiple different blockchains. For particular capital change information, the blockchain system may select a blockchain based on a type of the capital change information and store the capital change information in the selected blockchain. For example, a capital transfer block may be generated in the blockchain system for storing the capital transfer information, and the capital transfer block is added into a capital transfer blockchain; a capital withdrawal block may be generated in the blockchain system for storing the capital withdrawal information, and the capital withdrawal block is added into a capital withdrawal blockchain; and a capital deposit block is generated in the blockchain system for storing the capital deposit information, and the capital deposit block is added into a capital deposit blockchain. The blockchain system may include a capital transfer blockchain, a capital withdrawal blockchain, and a capital deposit blockchain.

At step S304: The user sends the blockchain system a query request for querying capital chain information of an account.

At step S305: The blockchain system queries the capital chain information corresponding to an identifier of the account.

At step S306: The blockchain system returns the capital chain information to the user.

In some embodiments, capital chain information is stored by a blockchain system; and owing to the tamper-proofing characteristic of a blockchain, the efficiency and reliability for tracing the capital chain information are improved, avoiding a query failure caused by a storage time limit, and also avoiding the time and resource consumption problem caused by querying the capital chain information by a third-party payment system. Moreover, through the method of deploying nodes in the blockchain system according to transaction locations of the third-party payment system, the blockchain system is created for serving the third-party payment system, thereby further improving the efficiency of tracing the capital chain information.

Figure 4:
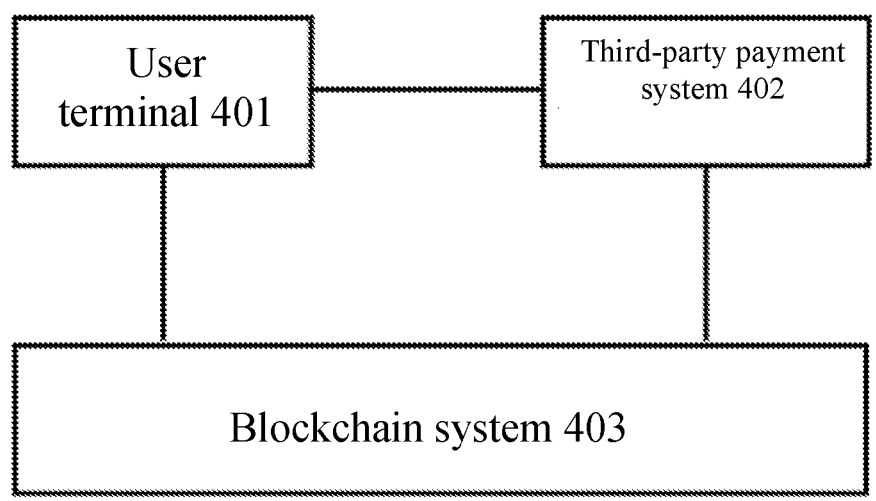
FIG. 4 shows a diagram structural of a capital chain information tracing system according to some embodiments of the specification.

Based on the same inventive concept, the embodiments of the specification provide a capital chain information tracing system. Referring to FIG. 4, the system comprises a user terminal 401, a third-party payment system 402, and a blockchain system 403.

The user terminal 401 is configured for sending the blockchain system 403 a query request for querying capital chain information of a target account in the third-party payment system 402; and the blockchain system 403 is configured for receiving and parsing the query request to obtain an account identifier, and for querying to obtain the capital chain information of the target account according to the account identifier.

In some embodiments, the third-party payment system 402 is configured for calling the blockchain system 403 to record capital change information into the blockchain system 403 when a capital change occurs in the target account.

In some embodiments, the blockchain system 403 is configured for providing an interface accessible to the third-party payment system 402, such that the third-party payment system 402 can call the blockchain system 403 via the interface.

In some embodiments, the blockchain system 403 may include corresponding blockchain nodes set up in various regions according to a transaction deployment of the third-party payment system 402; and the blockchain system 403 is configured for querying the corresponding blockchain nodes in the various regions, and recording the capital change information into a blockchain node corresponding to the region where capital change associated with the capital change information occurs.

In some embodiments, the capital change information comprises capital transfer information, capital withdrawal information, and capital deposit information; and the blockchain system 403 is configured for: for the capital transfer information, generating a capital transfer block and adding the capital transfer block into a capital transfer blockchain; for the capital withdrawal information, generating a capital withdrawal block, and adding the capital withdrawal block into a capital withdrawal blockchain; and for the capital deposit information, generating a capital deposit block, and adding the capital deposit block into a capital deposit blockchain. The blockchain system 403 may include a capital transfer blockchain, a capital withdrawal blockchain, and a capital deposit blockchain. The blockchain system 403 may be further configured to select a blockchain from these blockchains in the blockchain system 403 based on a type of a piece of capital change information and store the piece of capital change information in the selected blockchain.

In some embodiments, the blockchain system 403 is further configured for parsing the query request to obtain a query condition, and obtaining the capital chain information of the target account, which meets the query condition, according to the query condition.

In some embodiments, the query condition comprises a capital change time frame, a capital inflow or outflow direction, capital transaction party information, or a combination thereof.

Based on the same inventive concept as the capital chain information tracing methods in the above-described embodiments, the embodiments of the specification provide a server for tracing capital chain information of an account. As show in FIG. 5, the server comprises a memory 504, a processor 502, and a computer program stored in the memory 504 and executable by the processor 502; the processor 502, when executing the program, implements steps of any above-described capital chain information tracing methods.

Figure 5:
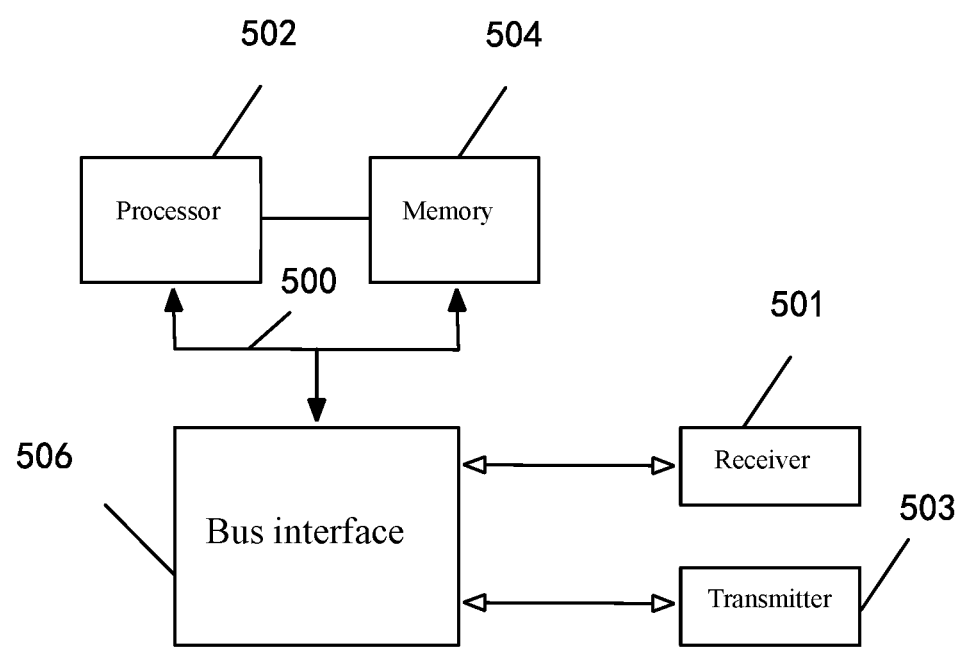
FIG. 5 shows a schematic structural diagram of a capital chain information tracing server according to some embodiments of the specification.

In FIG. 5, a bus architecture is represented by a bus 500. The bus 500 may comprise any number of interconnected buses and bridges, and link together various circuits of one or more processors represented by the processor 502 and a memory represented by the memory 504. The bus 500 may further link together various other circuits such as a peripheral device circuit, a voltage stabilizer circuit, and a power management circuit, which are not described further herein. A bus interface 506 provides an interface among the bus 500, a receiver 501 and a transmitter 503. The receiver 501 and the transmitter 503 may be a same element, namely a transceiver, to act as a unit for communicating with various other apparatuses on a transmission medium. The processor 502 is configured for managing the bus 500 and general processing, and the memory 504 may be used to store data used by the processor 502 when performing operations.

Based on the same inventive concept as the capital chain information tracing methods in the above-described embodiments, the embodiments of the specification provide a computer-readable storage medium storing a computer program; and the program, when executed by a processor, causes the processor to implement steps of any above-described capital chain information tracing methods.

The present description is described with reference to the flow charts and/or block diagrams of the method, device (system), and computer program product according to the embodiments of the specification. It should be understood that each flow and/or block in the flow charts and/or the block diagrams, and a combination of the flows and/or the blocks in the flow charts and/or the block diagrams can be implemented via computer program instructions. The computer program instructions may also be loaded onto a general-purpose computer, a specialized computer, an embedded processor, or the processors of other programmable data processing devices to produce a computer such that the instructions executed by the computer or other processors of the programmable apparatus generate a device for implementing the functions specified in one or more flows in a flow chart and/or one or more blocks in a block diagram.

The computer program instructions can also be stored in a computer readable memory which can boot a computer or other programmable data processing devices to operate in a specific manner, such that the instructions stored in the computer readable memory generate a product comprising an instruction apparatus, wherein the instruction apparatus is configured to realize the functions specified in one or more flows in a flow chart and/or one or more blocks in a block diagram.

The computer program instructions can also be loaded to a computer or other programmable data processing devices, so as to execute a series of operation steps on the computer or the other programmable devices to generate a computer-implemented process, such that the instructions executed on the computer or the other programmable devices can provide steps for implementing the functions specified in one or more flows in a flow chart and/or one or more blocks in a block diagram.

Although some embodiments of the specification have been described, those skilled in the art may make additional alterations and modifications to these embodiments once they learn the basic inventive concept. Therefore, the attached claims are intended to be interpreted to include the preferred embodiments, and all alterations and modifications which fall within the scope of the specification.

Obviously, those skilled in the art may make all types of modifications and variations to the specification without departing from the spirit and scope of the specification. In this way, if these modifications and variations of the specification fall within the scope of the claims of the specification and their equivalent technologies, the specification is also intended to include these modifications and variations.

The invention claimed is:

1. A computer-implemented method for tracing capital chain information, performed by a blockchain system comprising of a plurality of blockchain nodes respectively corresponding to a plurality of regions in which transaction on a third-party payment platform occur, the method comprising:

receiving, by the blockchain system from the third-party payment platform, a call to record capital change information associated with a transaction with respect to a target account;

querying, by the blockchain system, for a blockchain node corresponding to a region where the transaction occurred;

recording, by the blockchain system, the capital change information associated with the transaction in the blockchain node corresponding to the region where the transaction occurred, wherein the recording comprises:
  generating a blockchain transaction based on the capital change information;
  adding the blockchain transaction onto a block that comprises an index, a transaction list, and a hash value of a previous block in a blockchain;
  performing consensus processing on the block according to a consensus mechanism of the blockchain to reach a consensus; and
  chaining the block on the blockchain after the consensus has been reached;

receiving, by the blockchain system from a user terminal, a query request for querying capital chain information of the target account;

parsing, by the blockchain system, the query request to obtain an account identifier of the target account and a query condition;

retrieving, by the blockchain system based on the obtained account identifier, a plurality of pieces of capital change information of the target account meeting the query condition, wherein the plurality of pieces of capital change information of the target account are pre-recorded in the blockchain system based on the consensus mechanism;

obtaining, by the blockchain system, the capital chain information by linking the plurality of pieces of capital change information based on information associated with a timeline or a plurality of participants associated with the pieces of capital change information; and sending, to the user terminal, the obtained capital chain information of the target account.

2. The method according to claim 1, wherein the target account is associated with the third-party payment platform, and wherein transactions on the third-party payment platform cause a plurality of capital changes associated with the plurality of pieces of capital change information.

3. The method according to claim 1, wherein receiving the call to record the capital change information associated with the transaction with respect to the target account comprises:
  providing an interface accessible to the third-party payment platform; and
  receiving an application programming interface (API) call from the third-party payment platform via the interface.

4. The method according to claim 1, wherein the plurality of pieces of capital change information comprises capital transfer information, capital withdrawal information, or capital deposit information; and
  wherein recording the capital change information associated with the transaction in the blockchain node corresponding to the region where the transaction occurred further comprises:
    selecting the blockchain from a plurality of blockchains associated with the blockchain system based on a type of the capital change information associated with the transaction.

5. The method according to claim 1, wherein the query condition comprises a capital change time frame, a capital inflow or outflow direction, or capital transaction party information.

6. The method according to claim 1, wherein the consensus mechanism comprises: proof-of-work (PoW), proof-of-stake (POS), delegated proof-of-stake (DPoS), practical byzantine fault tolerance (PBFT), or delegated byzantine fault tolerance (DBFT).

7. A system for tracing capital chain information, comprising: one or more processors and one or more non-transitory computer-readable memories coupled to the one or more processors and configured with instructions executable by the one or more processors to cause the computing device to perform operations comprising:
  receiving a call to record capital change information associated with a transaction with respect to a target account;
  querying for a blockchain node corresponding to a region where the transaction occurred;
  recording the capital change information associated with the transaction in the blockchain node corresponding to the region where the transaction occurred, wherein the recording comprises:
    generating a blockchain transaction based on the capital change information;
    adding the blockchain transaction onto a block that comprises an index, a transaction list, and a hash value of a previous block in a blockchain;
    performing consensus processing on the block according to a consensus mechanism of the blockchain to reach a consensus; and
    chaining the block on the blockchain after the consensus has been reached;
  receiving a query request for querying capital chain information of the target account;
  parsing the query request to obtain an account identifier of the target account and a query condition;
  retrieving, based on the obtained account identifier, a plurality of pieces of capital change information of the target account meeting the query condition, wherein the plurality of pieces of capital change information of the target account are pre-recorded in a blockchain system based on the consensus mechanism;
  obtaining the capital chain information by linking the plurality of pieces of capital change information based on information associated with a timeline or a plurality of participants associated with the pieces of capital change information; and
  sending the obtained capital chain information of the target account.

8. The system according to claim 7, wherein the target account is associated with a third-party payment platform, and wherein transactions on the third-party payment platform cause a plurality of capital changes associated with the plurality of pieces of capital change information.

9. The system according to claim 7, wherein receiving the call to record the capital change information associated with the transaction with respect to the target account comprises:
  providing an interface accessible to a third-party payment platform; and
  receiving an application programming interface (API) call from the third-party payment platform via the interface.

10. The system according to claim 7, wherein the plurality of pieces of capital change information comprises capital transfer information, capital withdrawal information, or capital deposit information; and wherein recording the capital change information associated with the transaction in the blockchain node corresponding to the region where the transaction occurred further comprises:
  selecting the blockchain from a plurality of blockchains associated with the blockchain system based on a type of the capital change information associated with the transaction.

11. The system according to claim 7, wherein the query condition comprises a capital change time frame, a capital inflow or outflow direction, or capital transaction party information.

12. The system according to claim 7, wherein the consensus mechanism comprises: proof-of-work (PoW), proof-of-stake (POS), delegated proof-of-stake (DPoS), practical byzantine fault tolerance (PBFT), or delegated byzantine fault tolerance (DBFT).

13. A non-transitory computer-readable storage medium configured with instructions executable by one or more processors to cause the one or more processors to perform operations comprising:
  receiving a call to record capital change information associated with a transaction with respect to a target account;
  querying for a blockchain node corresponding to a region where the transaction occurred;
  recording the capital change information associated with the transaction in the blockchain node corresponding to the region where the transaction occurred, wherein the recording comprises:
    generating a blockchain transaction based on the capital change information;
    adding the blockchain transaction onto a block that comprises an index, a transaction list, and a hash value of a previous block in a blockchain;
    performing consensus processing on the block according to a consensus mechanism of the blockchain to reach a consensus; and
    chaining the block on the blockchain after the consensus has been reached;
  receiving a query request for querying capital chain information of the target account;
  parsing the query request to obtain an account identifier of the target account and a query condition;
  retrieving, based on the obtained account identifier, a plurality of pieces of capital change information of the target account meeting the query condition, wherein the plurality of pieces of capital change information of the target account are pre-recorded in a blockchain system based on the consensus mechanism;
  obtaining the capital chain information by linking the plurality of pieces of capital change information based on information associated with a timeline or a plurality of participants associated with the pieces of capital change information; and
  sending the obtained capital chain information of the target account.

14. The non-transitory computer-readable storage medium according to claim 13, wherein the target account is associated with a third-party payment platform, and wherein transactions on the third-party payment platform cause a plurality of capital changes associated with the plurality of pieces of capital change information.

15. The non-transitory computer-readable storage medium according to claim 13, wherein receiving the call to record the capital change information associated with the transaction with respect to the target account comprises:

providing an interface accessible to the a third party payment platform; and receiving an application programming interface (API) call from the third-party payment platform via the interface.

16. The non-transitory computer-readable storage medium according to claim 13, wherein the plurality of pieces of capital change information comprises capital transfer information, capital withdrawal information, or capital deposit information; and wherein recording the capital change information associated with the transaction in the blockchain node corresponding to the region where the transaction occurred further comprises:

selecting the blockchain from a plurality of blockchains associated with the blockchain system based on a type of the capital change information associated with the transaction.

17. The non-transitory computer-readable storage medium according to claim 13, wherein the query condition comprises a capital change time frame, a capital inflow or outflow direction, or capital transaction party information.

18. The non-transitory computer-readable storage medium according to claim 13, wherein the consensus mechanism comprises: proof-of-work (PoW), proof-of-stake (POS), delegated proof-of-stake (DPoS), practical byzantine fault tolerance (PBFT), or delegated byzantine fault tolerance (DBFT).

* * * * *